United States Patent  (10) Patent No.: US 10,924,926 B1
Nadig et al.  (45) Date of Patent: Feb. 16, 2021

(54) COMMUNICATIONS TOKEN PRE-FETCH

(71) Applicant: Amazon Technologies, Inc., Seattle, WA (US)

(72) Inventors: Vinaya Nadig, Redmond, WA (US); Tu Dien Do, Ontario (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/289,205

(22) Filed: Feb. 28, 2019

(51) Int. Cl.
*H04W 12/06* (2009.01)
*H04L 29/06* (2006.01)
*G10L 15/18* (2013.01)
*G10L 15/16* (2006.01)
*G10L 15/22* (2006.01)

(52) U.S. Cl.
CPC ............ *H04W 12/06* (2013.01); *G10L 15/16* (2013.01); *G10L 15/1822* (2013.01); *G10L 15/22* (2013.01); *H04L 63/0807* (2013.01); *H04L 63/102* (2013.01); *H04L 65/1006* (2013.01); *H04L 65/608* (2013.01); *G10L 2015/223* (2013.01)

(58) Field of Classification Search
CPC .................................................... H04W 12/06
See application file for complete search history.

(56) References Cited

U.S. PATENT DOCUMENTS

| 2012/0151570 | A1* | 6/2012 | Cooppan | H04L 63/0823 726/10 |
| 2014/0074944 | A1* | 3/2014 | Oberle | H04L 51/28 709/206 |
| 2014/0281533 | A1* | 9/2014 | de Andrade | H04L 63/08 713/168 |
| 2017/0149867 | A1* | 5/2017 | Lee | H04W 12/06 |

* cited by examiner

*Primary Examiner* — Kevin M Cunningham
(74) *Attorney, Agent, or Firm* — Pierce Atwood LLP

(57) ABSTRACT

Techniques for using sending communication data using a first communication system and a second communication system are described. When a request is received to send communication data, it is determined that sending the communication data includes the second communication system. A request for updated identification information, such as a security token, is therefore sent to the second communication system prior to, for example, determining further account information related to the initiator of the communication and/or an identity of a recipient of the communication. While the request is pending, additional requests for the identification information are delayed. When the new identification information is received, the communication data is sent.

18 Claims, 15 Drawing Sheets

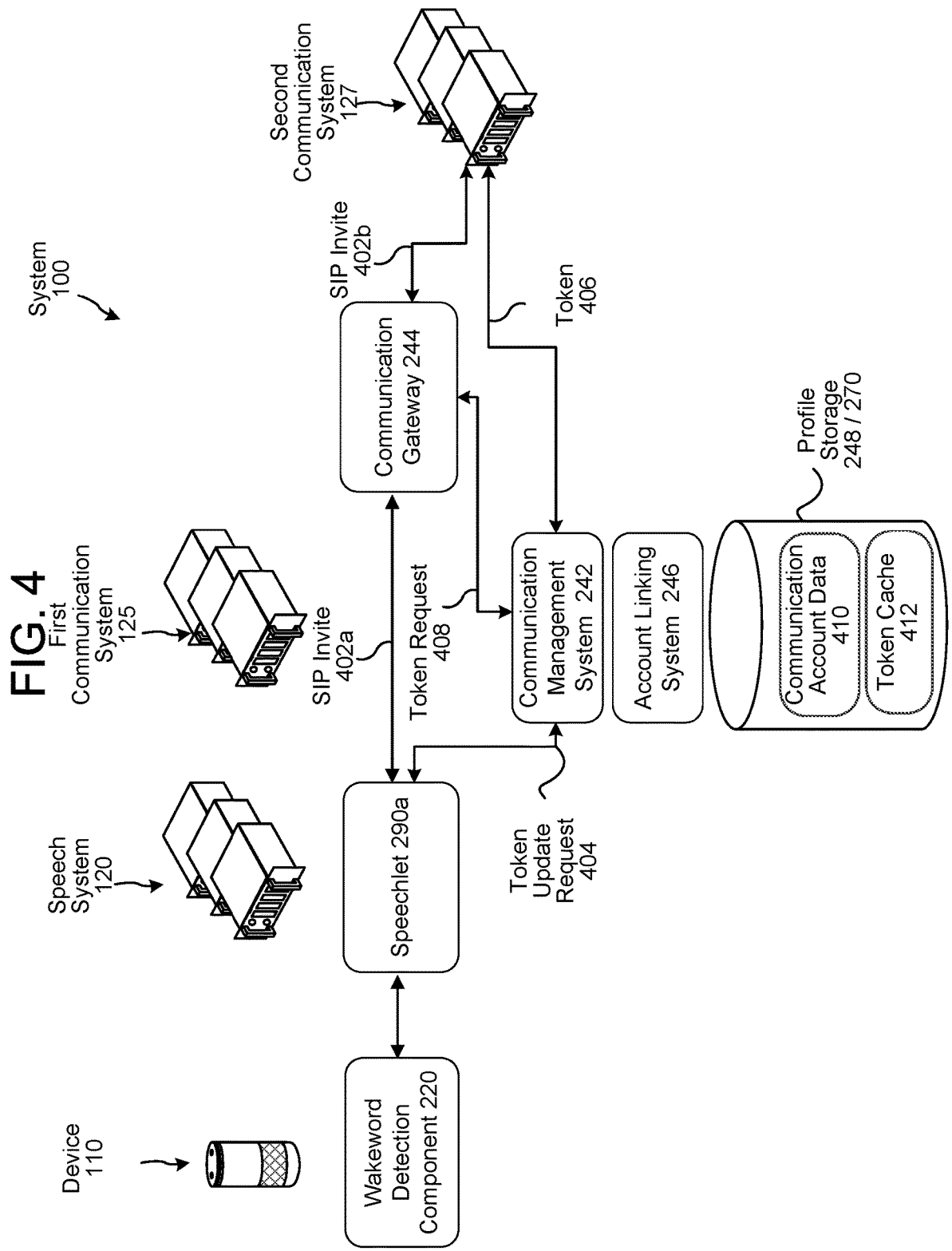

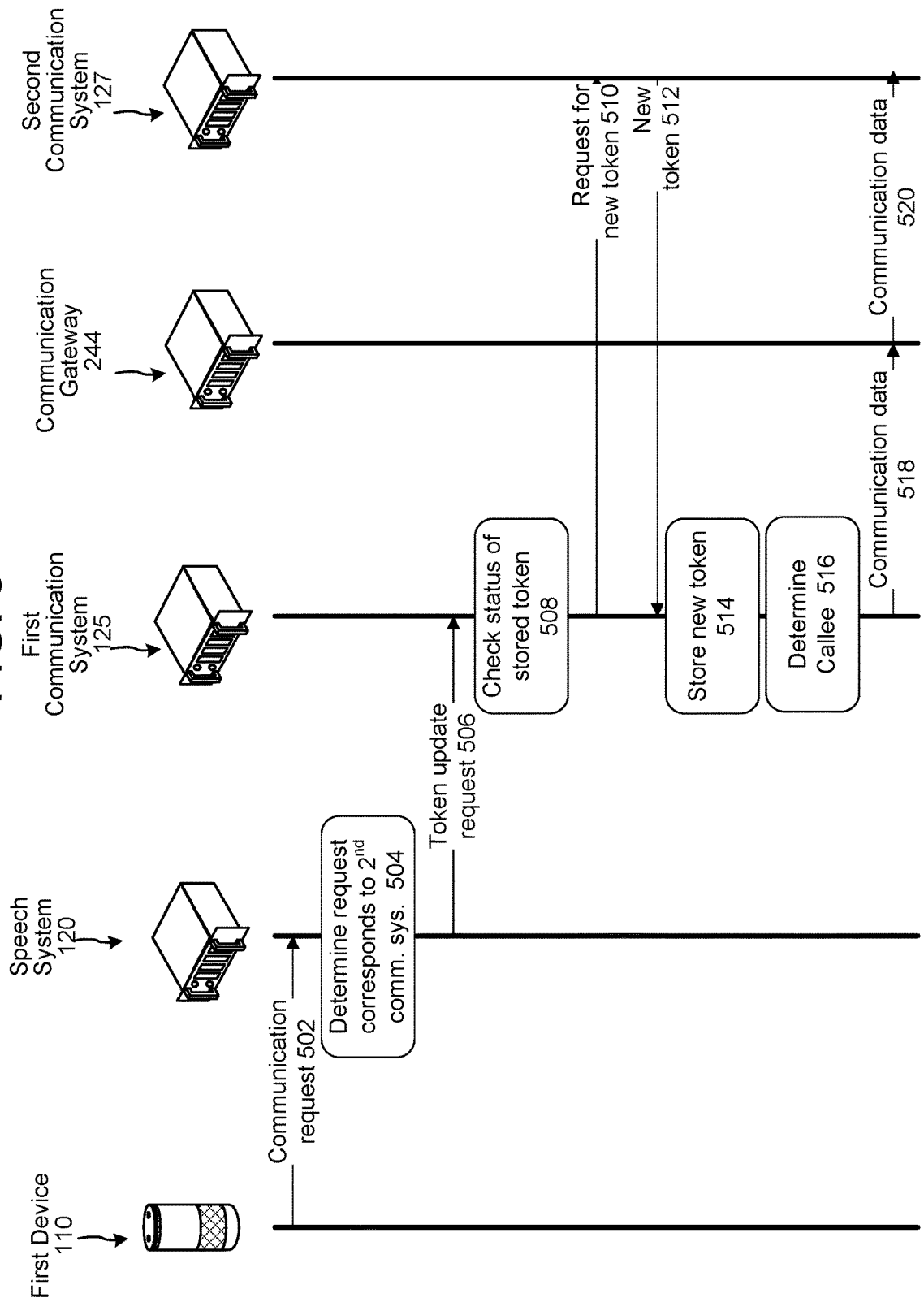

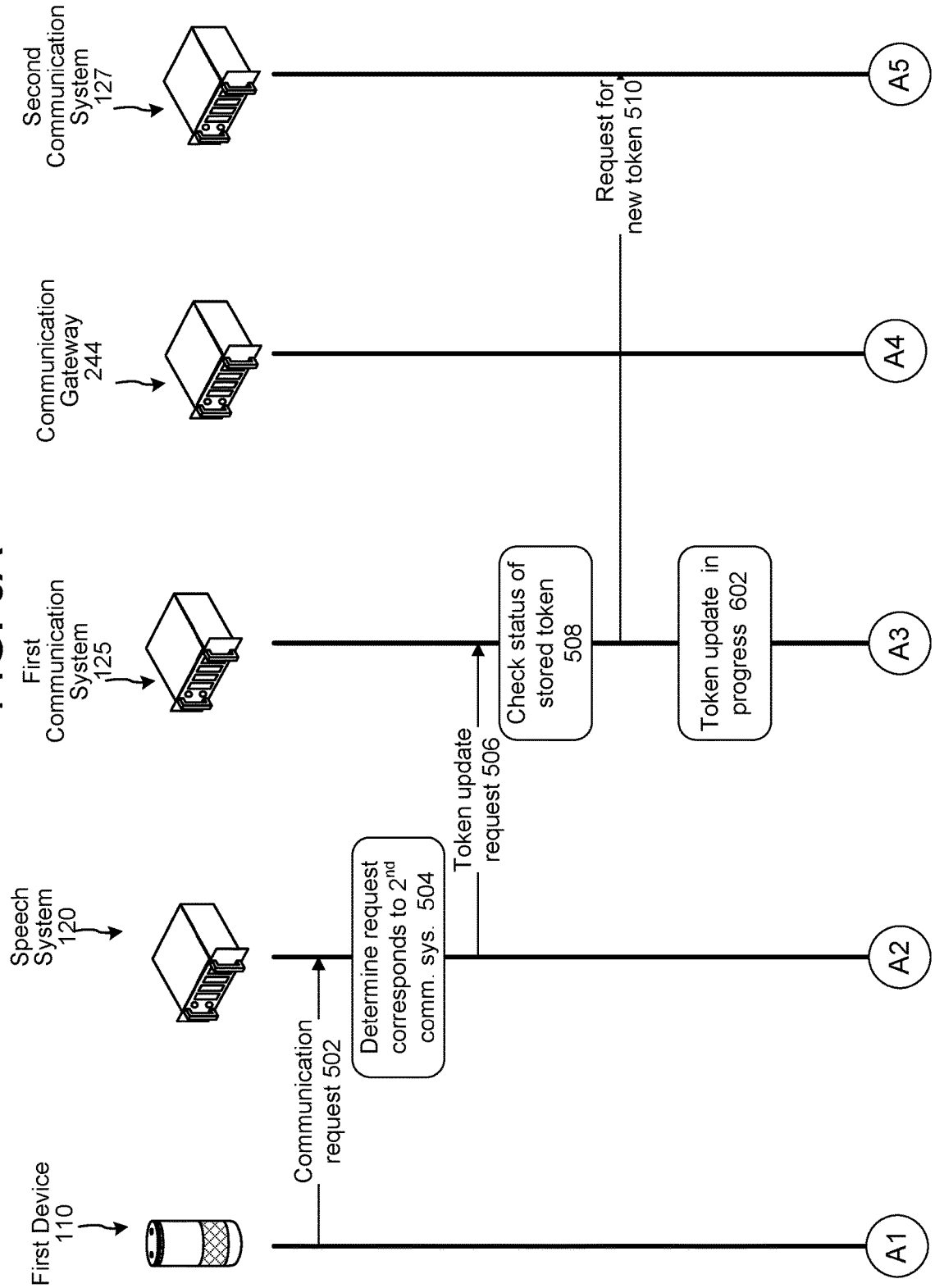

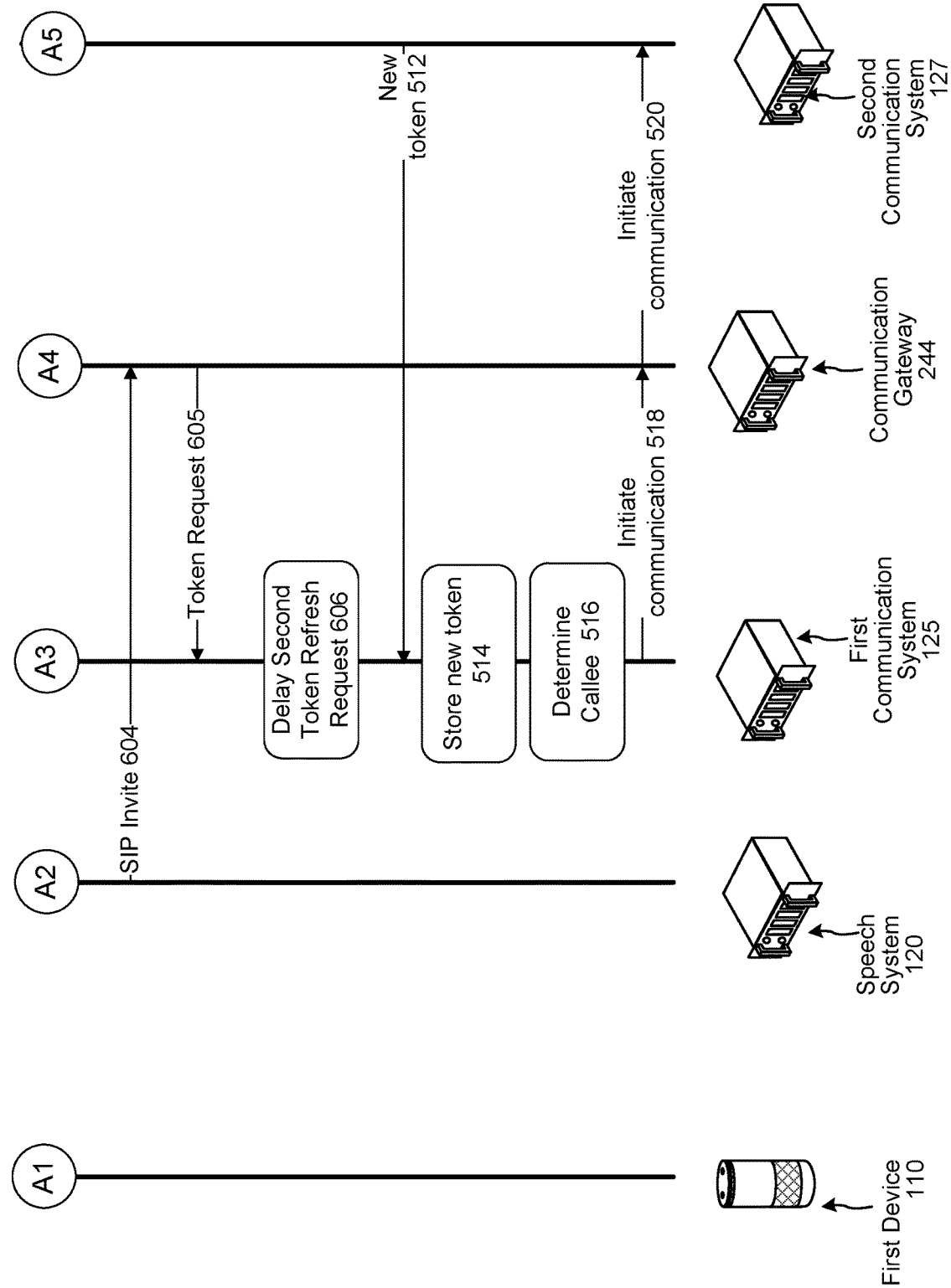

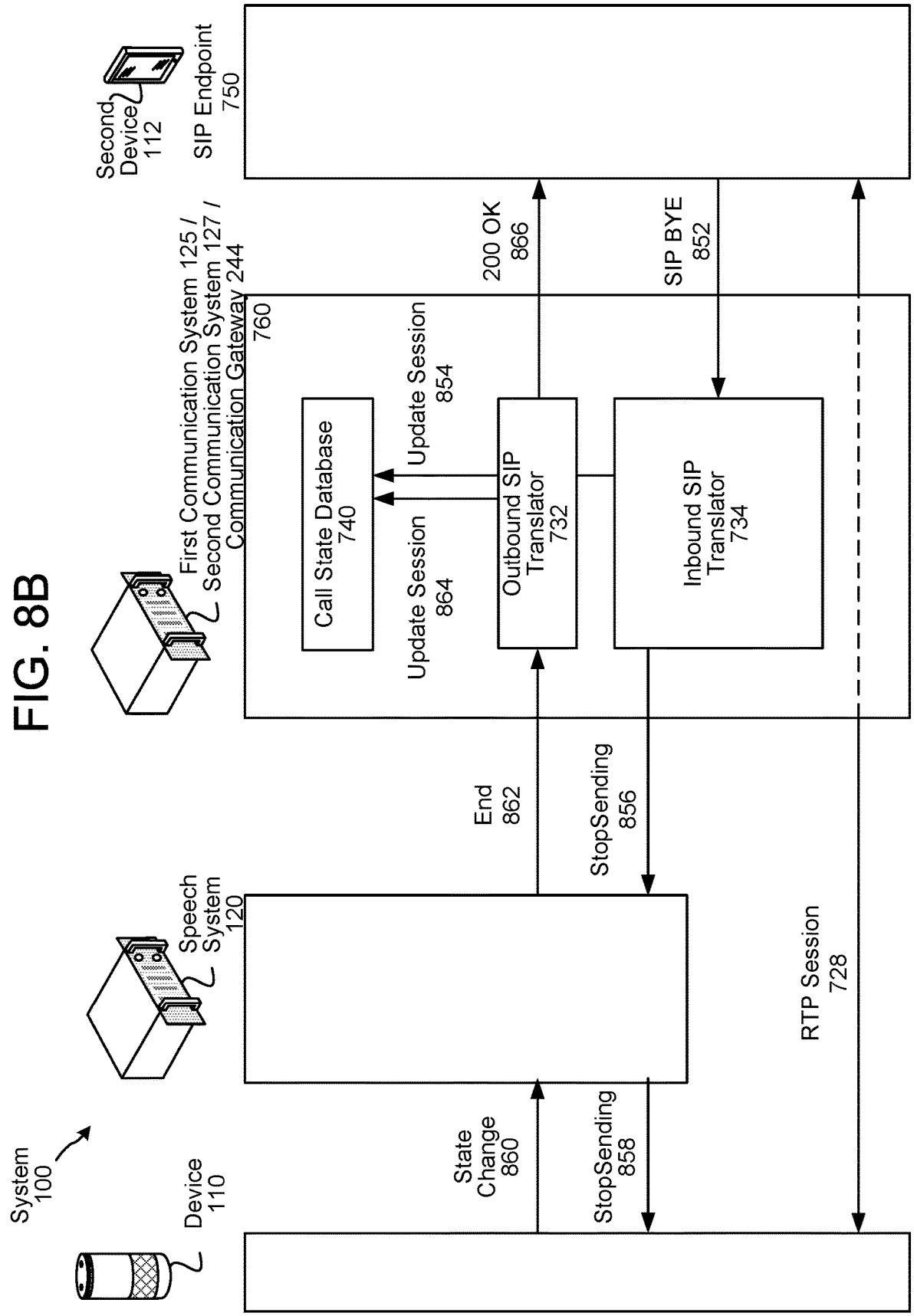

US 10,924,926 B1

COMMUNICATIONS TOKEN PRE-FETCH

BACKGROUND

Speech recognition systems have progressed to the point where humans can interact with computing devices using their voices. Such systems employ techniques to identify the words spoken by a human user based on the various qualities of a received audio input. Speech recognition processing combined with natural language understanding processing enable speech-based user control of computing devices to perform tasks based on the user's spoken commands. The combination of speech recognition processing and natural language understanding processing techniques is referred to herein as speech processing. Speech processing may also involve converting a user's speech into text data which may then be provided to speechlets. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 is a diagram of components of first and second communication systems according to embodiments of the present disclosure.

FIG. 5 is a process flow diagram illustrating a process for pre-fetching identification information according to embodiments of the present disclosure.

FIGS. 6A and 6B are process flow diagrams illustrating another process for pre-fetching identification information according to embodiments of the present disclosure.

FIGS. 8A and 8B illustrate examples of signaling to end a communication session according to embodiments of the present disclosure.

DETAILED DESCRIPTION

Figure 1:
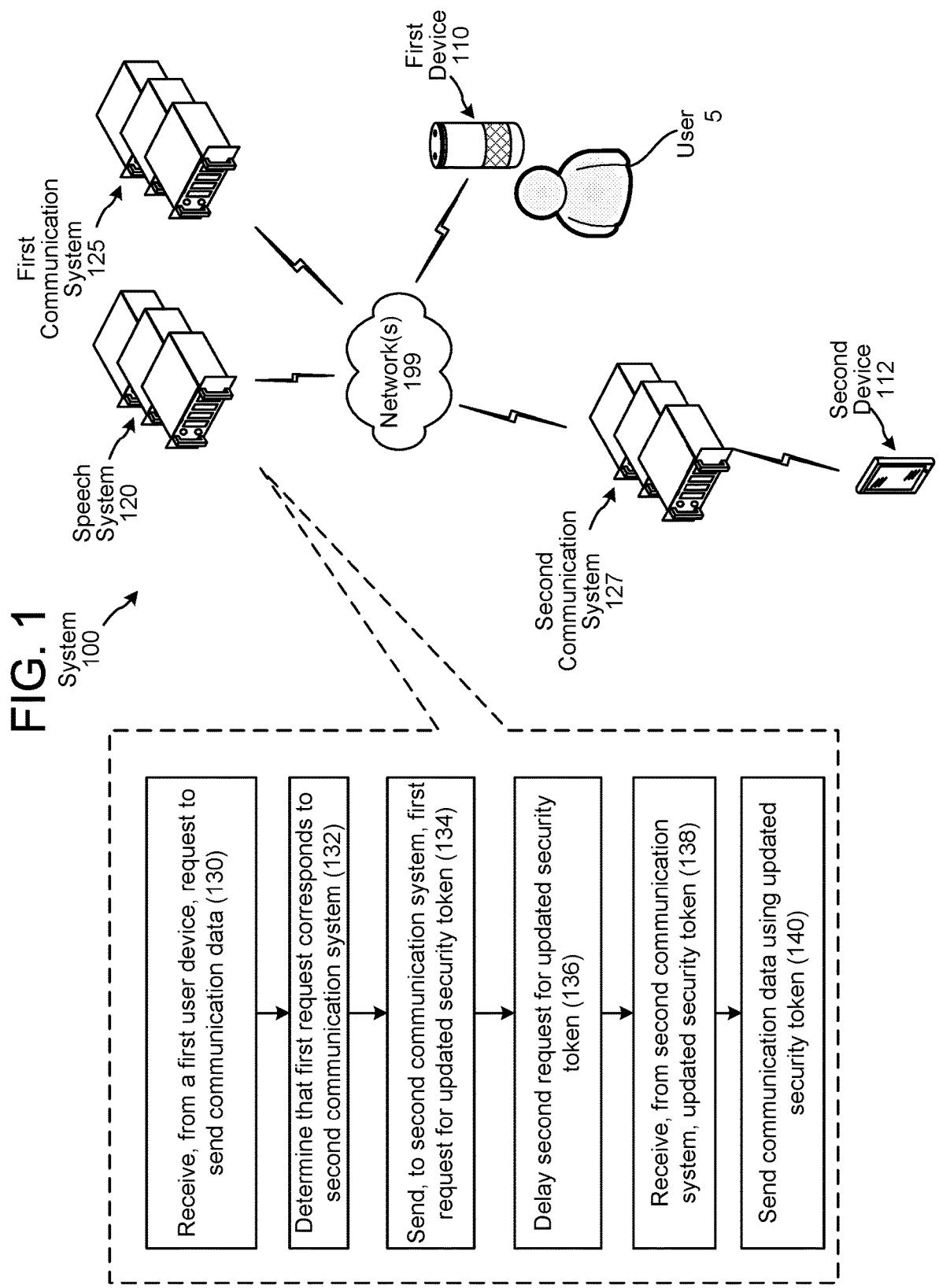
FIG. 1 is a diagram of a system configured to, using a first communication system, pre-fetch identification information from a second communication system according to embodiments of the present disclosure.

Automatic speech recognition (ASR) is a field of computer science, artificial intelligence, and linguistics concerned with transforming audio data representing speech into text data representative of that speech. Natural language understanding (NLU) is a field of computer science, artificial intelligence, and linguistics concerned with enabling computers to derive meaning from text data containing natural language. Text-to-speech (TTS) is a field of computer science, artificial intelligence, and linguistics concerned with enabling computers to output synthesized speech. ASR, NLU, and TTS may be used together as part of a speech processing system.

Certain systems may perform actions in response to user inputs, which may originate as user speech. For example, a system may establish communication between two devices in response to receiving a user input corresponding to "Alexa, call Bob." For further example, a system may send a message in response to a user input corresponding to "Alexa, send a message to Bob."

Certain systems may include communication functionality that enable users to send messages to other users as well as perform calls with other users. For example, if a user speaks "Alexa, tell John I am on my way" to a system device, the system may send a message to "John" with the message's content corresponding to audio of "I am on my way" and/or a text transcription thereof (i.e., a one-way communication session). For further example, if a user says "Alexa, call John" to a system device, the system may establish a two-way communication session between the system device and a device associated with "John."

In order to send messages to a recipient and/or call the recipient, a user of the system may create a user profile with the system and import one or more contact lists to the profile. For example, when a user signs up for communication functionality of the system, the user may provide the system with permission to import their contacts from their personal device (e.g., a smart phone), other account, or other source. The system may also determine the recipient using other sources of contact information, such as phone-number databases, business or professional websites, and/or social media websites. The user may provide an email address, social-media alias, or some other communication identifier to the system.

Embodiments of the present invention enable a first user of a first communication system to send and receive one-way communication data (e.g., data corresponding to set-up or use of synchronous or asynchronous messages) and/or send and receive two-way synchronous communication data (e.g., data corresponding to set-up or use of an audio or video call) with a second user of a second communication system. Asynchronous messages include communication data representing audio, images, and/or video sent from a first device at a first time and delivered to a second device at a second time after the first time; a user of the first device may receive a receipt when the data is delivered and/or read. Synchronous messages include communication data representing audio and/or video that is sent in real time (i.e., streamed) from the first device to the second device.

The first user may have a first contact list associated with the first communication system and a second contact list associated with the second communication system; the first user may be using a first device associated with the first communication system and may wish to send and/or receive communications with a second user who uses both the first and second communication systems or only to the second communication system. The first user may a first account associated with the first communication system and a second account associated with the second communication system. The first user may integrate a second contact list associated with the second account with the first account by, for example, sending, to the second communication system, a request for integration and by providing identification information, such as a username and/or password. The first communication system may send the username and/or password to the second communication system, which may then provide information regarding the account of the first user associated with the second communication system, such as a contact list, security token, or other such information. When the first user requests communication with the second user, the first communication system may determine that the second user is represented in both the first contact list and the second contact list. The first communication system may determine which communication system to send the request to. The first communication system may send a request to the second communication system to establish communication therewith.

In some embodiments, the first communication system may determine to use the second communication system to establish a communication session between a first device associated with the first communication system and a second device associated with the second communication system. For example, the first communication system may determine to use the second communication system if the second device associated with the second communication system is not able to receive communication data directly from the first communication system. The first communication system may further determine to use the second communication system if, for example, the first communication system determines that a third device associated with the first communication system is not powered on or not active. The first communication system may determine that the third device is not powered on or is inactive by, for example, querying a saved status of the third device, which may periodically report its status to the first communication system and/or by sending a request to the third device to report its status.

The first communication system may further determine to use the second communication system if a software application required by the second device for using the first communication system is not installed or not active on the second device. The first communication system may instead or in addition determine to use the second communication system by sending a command to the third device to output a notification of an incoming call and/or message and determining that the second user has not responded to the notification by, for example, providing input to the third device.

As used herein, a communication modality may be associated with a particular system's application program interfaces (APIs), protocols, etc. Each communication modality may be associated with a different skill, communication/ messaging protocols, encryption techniques, etc. A particular modality may be capable of communicating using one or more different mediums. For example, one modality, such as an application may allow a user to engage in different types of communication (e.g., text messages, video calls, etc.) using the particular application. A user may have a particular identity, such as a first username, associated with one particular modality and another identity/identifier, such as a second username, associated with a different modality. For example, a user's identifier with the first communication system may be JohnSmith12345 while the same user's identifier with the second communication system may be JohnRSmith.

In various embodiments, the second communication system may require identification information, such as a security token, to accompany a request to use the second communication system and may reject requests lacking the identification information to protect against, for example, malicious or fraudulent requests. The second communication system may provide this identification information to the device, and/or first communication system if and/or when the device, and/or first communication system first provides authentication information associated with a second account of the second communication system, such as the second username and associated password associated with the second account. The identification information may be a sequence of letters, symbols, and or numbers that uniquely identify the first account, second account, and/or device, such as a 128-bit binary number. The second communication system may compare received identification information against a database of saved identification information and, if matching identification information is found (and/or, in some embodiments, determined to correspond to the device, first account, and/or second account), the second communication system may thereafter proceed in establishing communications with the second user.

In some embodiments, the identification information is valid for identification for only a limited period of time, such as one hour. When the information becomes invalid after the period of time expires, the second communication system may no longer allow communication requests that accompany the expired authentication information. In these embodiments, the device, system, and/or first communication system may request updated, non-expired identification information. This request may be accompanied by information identifying the device, system, and/or first communication system, such as an Internet Protocol (IP) address or Media Access Control (MAC) address and/or by authentication information associated with the second account, such as the username and password. If the device and/or first communication system determines that a command was received from the device to establish communications using the second communication system, and if the identification information is expired, requesting and receiving updated identification information may introduce latency to the sending of the communication.

In various embodiments of the present disclosure, the latency associated with updating the identification information is reduced by pre-fetching the identification information. When a request to send communication data is received, the system first determines the information necessary to update the identification information, if required, before and/or in parallel with other determinations related to sending the communication data, such as determining additional information related to an initiating user and/or an intended recipient. The system then sends the request and thus receives updated identification information in response.

FIG. 1 illustrates a system 100 configured for, using a first communication system, pre-fetching identification information (i.e., a security token) from a second communication system. Although the figures and discussion of the present disclosure illustrate certain operational steps of the system 100 in a particular order, the steps described may be performed in a different order (as well as certain steps removed or added) without departing from the intent of the disclosure. A first device 110 of a user 5, one or more speech systems 120, and one or more first communication systems 125 may communicate using one or more networks 199. A second communication system 127 may be used to communicate with a second device 112. The user 5 may be a human, business entity, computing device, and/or component of a computing device.

The below description describes the steps of FIG. 1 being performed by the speech system 120. One skilled in the art will appreciate that the first communication system 125 may perform some or all of the steps described with respect to FIG. 1 without departing from the present disclosure.

The speech system 120 receives (130), from a first device 110, a first request to send communication data to, for example, a person, device, or location. The communication data may correspond to a synchronous or asynchronous one-way communication or a synchronous two-way communication. The speech system 120 determines (132) that the communication data is intended for the second communication system 127 prior to or in parallel with other actions associated with sending the communication data, such as determining information about the initiating user 5 and/or intended recipient. The speech system 120 sends (134), to the second communication system, a request for updated identification information, such as an updated security token, after, in some embodiments, determining that a stored security token is expired. The speech system 120 may receive another request to update the security token triggered by a communication setup message, such as a SIP invite; the speech system 120 may delay (136) this second request while the first request is pending. The system receives (138) the updated security token and sends (140) the communication data using the updated security token.

Figure 2:
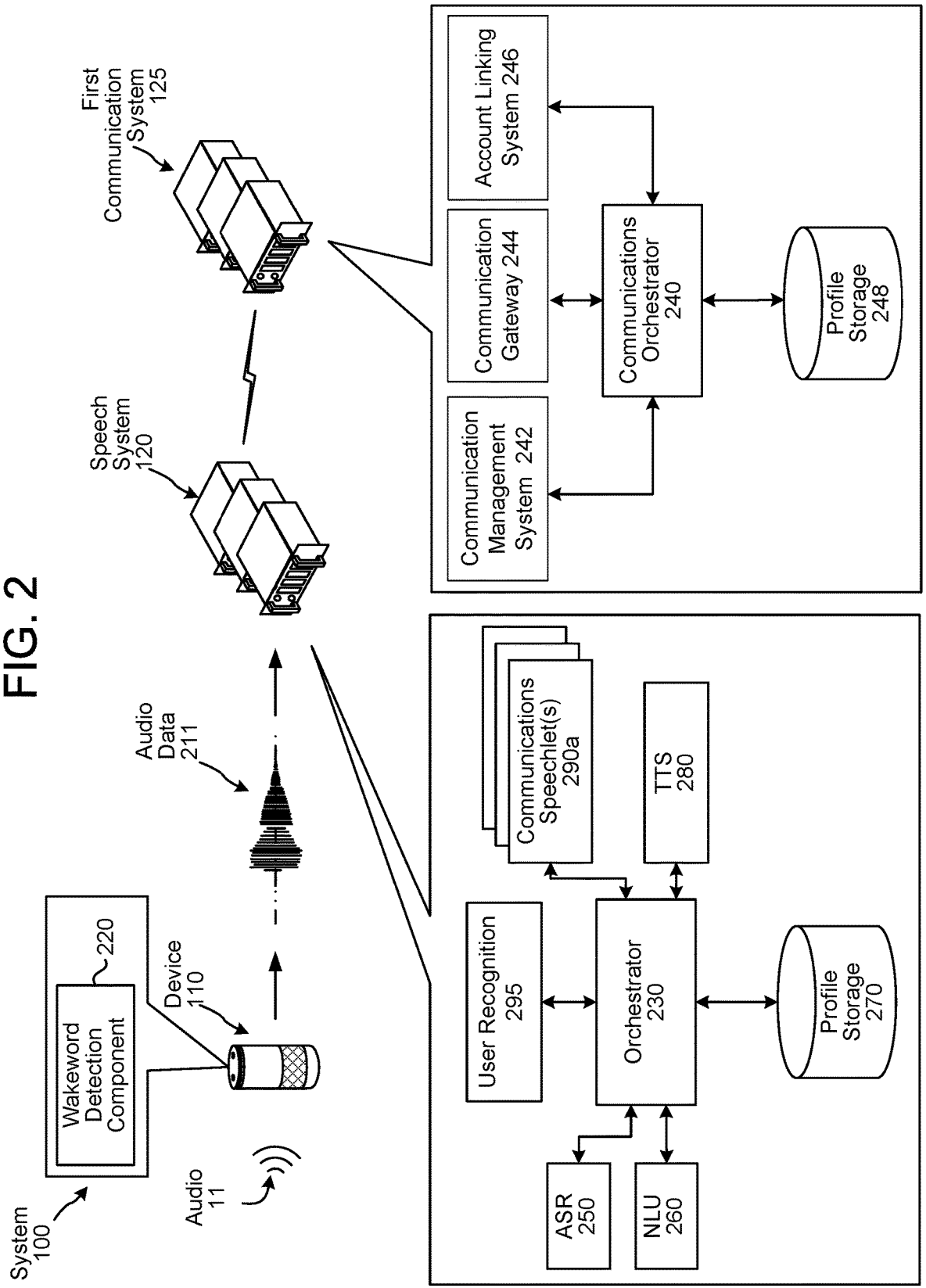
FIG. 2 is a diagram of components of a speech-processing system according to embodiments of the present disclosure.

FIG. 2 is a diagram of components of a system 100 according to embodiments of the present disclosure. An audio-capture component, such as a microphone or array of microphones of the device 110, captures audio 11. The device 110 may process audio data, representing the audio 11, to determine whether speech is detected. The device 110 may use various techniques to determine whether the audio data includes speech. Some embodiments may apply voice activity detection (VAD) techniques; such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the speech system 120 and/or may be provided by the user 5.

The wakeword detection component 220 may compare audio data to stored models or data to detect a wakeword. One approach for wakeword detection applies general large-vocabulary continuous speech-recognition (LVCSR) systems to decode audio signals, with wakeword searching being conducted in the resulting lattices or confusion networks. LVCSR decoding may require relatively high computational resources. Another approach for wakeword spotting uses HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may wake and begin transmitting audio data 211, representing the audio 11, to the system 120. The audio data 211 may include data corresponding to the wakeword, or the portion of the audio data 211 corresponding to the wakeword may be removed by the device 110 prior to sending the audio data 211 to the speech system 120.

Upon receipt by the speech system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units, such as phonemes, senons, phones, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent representing an action that a user desires be performed as well as pieces of the input text data that allow a device (e.g., the device 110, the speech system 120, the communication system 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated speechlet component 290. If the NLU results include multiple NLU hypotheses, the orchestrator component 230 may send a portion of the NLU results corresponding to the top scoring NLU hypothesis to a speechlet component 290, such as a first speechlet component 290a, associated with the top scoring NLU hypothesis.

A "speechlet" or "speechlet component" may be software running on the speech system 120 that is akin to a software application running on a traditional computing device. That is, a speechlet component 290 may enable the speech system 120 to execute specific functionality in order to perform one or more actions (e.g., provide information to a user, display content to a user, output music, or perform some other requested action). The speech system 120 may be configured with more than one speechlet component 290. For example, a weather speechlet component may enable the speech system 120 to provide weather information, a ride sharing speechlet component may enable the speech system 120 to schedule a trip with respect to a ride sharing service, a restaurant speechlet component may enable the speech system 120 to order food with respect to a restaurant's online ordering system, a communication speechlet component may enable the system to perform messaging or multi-endpoint communication, etc. A speechlet component 290 may operate in conjunction between the speech system 120 and other devices such as the device 110 or the first communication system 125 in order to complete certain functions. Inputs to a speechlet component 290 may come from various interactions and input sources. The first communication system 125 may include a communication orchestrator component 298 for orchestrating communication with the speech system 120 and/or device(s) 110.

The functionality described herein as a speechlet or speechlet component may be referred to using many different terms, such as an action, bot, application, or the like. A speechlet component 290 may include hardware, software, and/or firmware that may be dedicated to the particular speechlet component 290 or shared among different speechlet components 290. A speechlet component 290 may be part of the speech system 120 (as illustrated in FIG. 2) or may be located at whole (or in part) with one or more separate systems. Unless expressly stated otherwise, reference to a speechlet, speechlet device, or speechlet component may include a speechlet component operating within the speech system 120 (for example as speechlet component 290) and/or speechlet component operating within a system separate from the speech system 120.

A speechlet component 290 may be configured to perform one or more actions. An ability to perform such action(s) may be referred to as a "skill." A skill may enable a speechlet component 290 to execute specific functionality in order to provide data or produce some other output requested by a user. A particular speechlet component 290 may be configured to execute more than one skill. For example, a weather skill may involve a weather speechlet component providing weather information to the speech system 120, a ride sharing skill may involve a ride sharing speechlet component scheduling a trip with respect to a ride sharing service, an order pizza skill may involve a restaurant speechlet component ordering pizza with respect to a restaurant's online ordering system, etc.

A speechlet component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The speech system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The speech system 120 may include profile storage 270. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located.

The speech system 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

The first communication system 125 may similarly include a communications orchestrator component 240, which may include memory and logic that enable the communications orchestrator component 240 to transmit various pieces and forms of data to various components of the first communications system 127, as well as perform other operations. The first communication system 125 may further include profile storage 248, which, like the profile storage 270 described above, may include a variety of information related to individual users, groups of users, etc. that interact with the system. The profile storage 248 may include one or more user profiles, with each user profile being associated with a different user identifier. Each user profile may include various user identifying information. Each user profile may also include preferences of the user. Each user profile may also include one or more device identifiers, representing one or more devices of the user.

The first communication system 125 may further include and/or be in communication with a communication gateway 244. The communication gateway 244 may receive a request from a device, such as the first device 110, to establish communications with another device, such as the second device 112, via the second communication system 127. The request may be a SIP request, as explained in greater detail below with reference to FIGS. 7, 8A, and 8B; the communication gateway 244 may include the outbound SIP translator 732 and/or inbound SIP translator 734, as also explained in greater detail below. In some embodiments, the first device 110 sends the request via other systems, such as an edge proxy system and/or an authentication proxy system. The communication gateway 244 may similarly receive a request from the second device 112 to establish communications with the first device 110. As explained herein, the communications may include one-way communications (e.g., a message) and/or two-way communications (e.g., a voice or video call).

The first communication system 125 may further include a communication management system 242. In various embodiments, the communication management system 242 sends a request to the second communication system 127 for identification information, such as a security token. This request may include information identifying the first device 110, an account associated with the first device 110, and/or information related to authentication with respect to the second communication system 127, such as a username and password. The communication management system 242 may receive the identification information from the second communication system 127 and may store the identification information in a computer memory and/or computer storage, such as the profile storage 248.

The communication management system 242 may receive a request for the identification information from the communication gateway 244 and may provide the identification information to the communication gateway 244 in response to the request. The communication gateway 244 may initiate the request for the identification information when it receives, from the device 110 and/or system speech 120, a request to send or receive communications between the first device 110 and the second device 112 via the second communication system 127. The request, which may be a SIP invite, may include a request for the identification information and/or a request to verify if the identification is still valid (i.e., not expired).

The communication management system 242 may also or in addition receive a request for the identification information and/or a request to verify if the identification is still valid (i.e., not expired) from the speech system 120. In some embodiments, when the speech system 120 receives a request from the first device 110 to establish communications with the second device 112, it determines, as described herein, that the established communications include the second communication system 127. For example, the user 5 may provide an indication to the device 110 that identifies the second communication system 127, such as by inputting (by voice, touchscreen, keyboard, or other input device or method) data representing a name of the second communication system 127. When the speech system 120 determines that the request for communications includes the second communication system 127, it may send the request to the communication management system 242.

The communication management system 242 may, upon receipt of a request for the identification information, determine that it possesses an instance of the identification information as stored in a computer memory and/or computer storage, such as the profile storage 248. The instance of the identification information may correspond to a prior request for communications from the first device 110. If the communication management system 242 determines that the profile storage 248 includes the instance of the identification information, the communication management system 242 may further determine if the identification information is expired or unexpired. The identification information may expire, as explained above, if a certain amount of time has elapsed since the second communication system 127 created and/or sent the identification information. The communication management system 242 may determine expiration by comparing a present time with a time of receipt of the identification information and/or a time of request for the identification information. In some embodiments, the identification information includes the time of receipt, the time of request, and/or the expiration time; in these embodiments, the communication management system 242 may compare this included information to a present time to determine whether or not the identification information is expired.

In some embodiments, the communication management system 242 does not communicate directly with the second communication system 127; in these embodiments, the communication management system 242 communicates with an account linking system 246, which in turn communicates with the second communication system 127. The account linking system 246 may include application programming interfaces (APIs) and associated commands specifically designed to communicate with the second communication system 127, such as a "GetToken" API command and a "TokenFetched" API command. The account linking system 246 may communicate with additional communication systems other than the second communication system 127; in other embodiments, additional account linking systems 246 are used to communicate with the additional communication systems.

Figure 3:
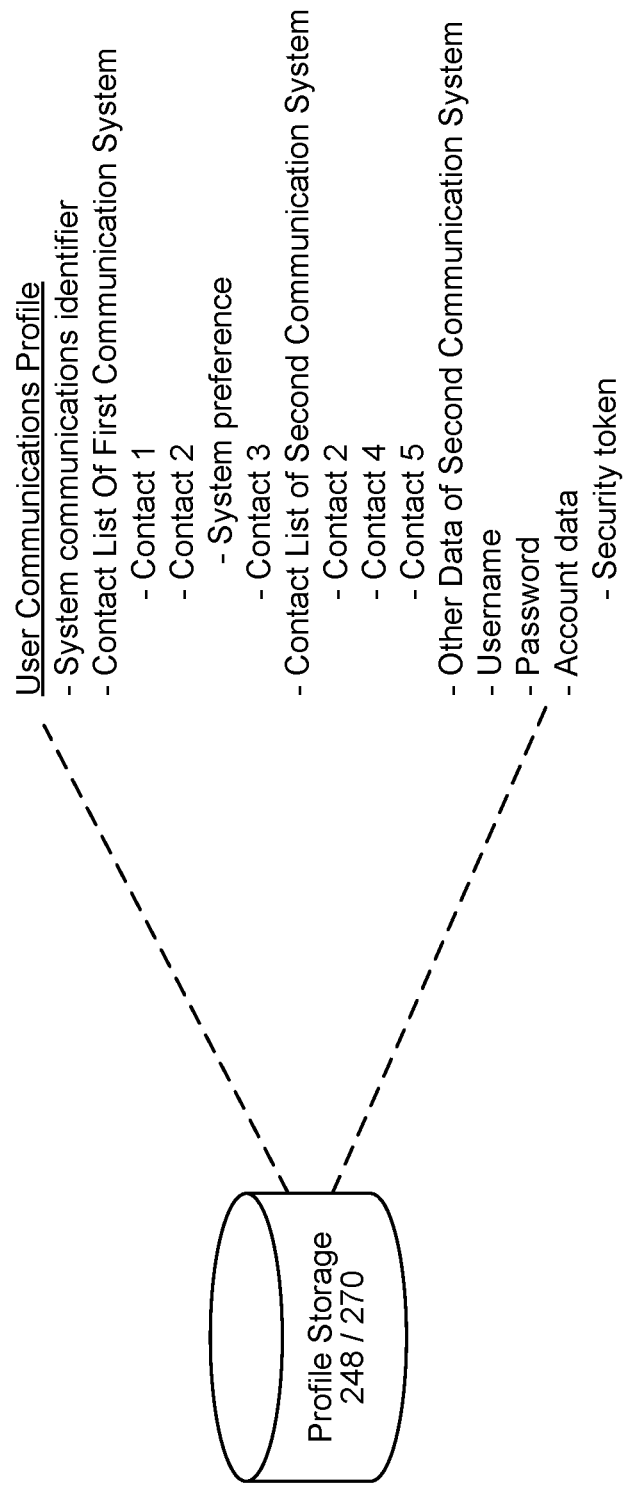
FIG. 3 is a diagram of a user's communication profile according to embodiments of the present disclosure.

FIG. 3 illustrates an example communication profile of a user stored in a communication profile storage 270/248. The communication profile storage 270/248 may, as described above, be implemented as part of the communication system 125 or the speech system 120.

When a user enables or signs up for communication functionality of the system, the system may generate a communication profile identifier specific to the user. The user may validate their phone number, address, or other information with the system. For example, the user may input their phone number to the system, and the system may then validate the phone number with a cellular service provider. Once validated, the system may store the phone number in the user's communication profile (e.g., the system may associate the user's phone number with the user's communication profile identifier).

The system may output a prompt to the user. The prompt may be displayed on a screen of the device 110 as text and/or output as audio by the device 110. The prompt may ask whether the user wants to import their contact list (e.g., a contact list stored on the device 110) to the system. If the user responds affirmatively, the system may import the contact list to the user's communication's profile in the communication profile storage 270/248 (e.g., the system may associate the user's contact list with the user's communication profile identifier). Alternatively, the system may import the contact list to a different storage (implemented as part of the communication system 125 or the speech system 120), and associate the stored contact list with the user's communication profile identifier via a contact list identifier.

The user may also validate various communication identifiers with the system. The various communication identifiers may correspond to different modalities of communication. Moreover, the communication identifiers may be associated with different communication systems. The system may validate and store the communication identifiers in the user's communication profile (e.g., may associate each of the user's validated communication identifiers with the user's communication profile identifier). For example, the user may send messages and/or perform calls via the internet using an internet-based communication system. For further example, the user may send messages via a messaging application downloaded on the device 110. The user may provide the system with their communication identifier of a communication system (different from the communication system described herein), the system of the present disclosure may validate the user's communication identifier with the communication system, and may thereafter store the user's communication identifier in the user's communication profile (e.g., associate the validated communication identifier with the user's communication profile identifier), along with a representation of the communication system associated with the communication identifier.

As illustrated in FIG. 3, a user's communication profile identifier may be associated with various communication identifiers of the user. When the user provides the system with a communication identifier to validate, the user may also provide the system with permission to import a first contact list associated with the user's communication identifier. The user may perform communication using various communication sources. Each communication source may store a respective contact list for the user. The user's communication profile identifier may be associated with the contact lists of each communication source the user permitted to be imported. As illustrated in FIG. 3, each contact list may be associated with the communication source from which it was imported. Alternatively, the system may be configured to conglomerate all of the user's imported contact lists into a single contact list associated with the user's communication profile identifier.

The user profile may further include information regarding the second communication system, including a second contact list associated with the second communication system. The first contact list and the second contact list may include common contacts, such as "Contact 2," as illustrated in FIG. 3. The first contact list may also include contacts not present in the second contact list, such as "Contact 1" and "Contact 2," as illustrated in FIG. 3. The second contact list may include contacts not present in the first contact list, such as "Contact 4" and "Contact 5," as illustrated in FIG. 3. As explained further herein, if the first user wishes to communicate with a contact present in only one contact list, such as "Contact 1" or "Contact 4," the speech system 120 may attempt to establish communication using only the corresponding communication system. If, however, the first user wishes to communicate with a contact present in both the first contact list and the second contact list, the speech system 120 may select one or both communication systems to attempt to establish communication.

The user profile may include further information regarding the second communication system 127, such as a username and/or password of the first user corresponding to the second communication system 127 and other information regarding the corresponding account of the first user, such as a security token. The first user may be prompted, using the first device 110, to provide this information after sending a request to integrate the account associated with the second communication system 127 with the speech system 120, after sending a request to communicate with the second user, or at any other time. The security token may be provided by the second communication system after, for example, the speech system 120 send the username and/or password to the second communication system 127. The security token may expire after a certain amount of time has elapsed, such as one hour, one day, or one week; the speech system 120 may, upon expiration of the security token, re-send the username and/or password to the second communication system 127 and receive an updated security token in response.

FIG. 4 illustrates communication using components and systems associated with the present disclosure. The device 110, and in particular the wakeword detection component 220, may communicate with the speechlet component 290a of the speech system 120 via a network such as the Internet using, in some embodiments, the orchestrator component 230. A user of the device 110 may wish to communicate with a second device 112 to send and/or receive communication data by, in some embodiments, speaking a wakeword and a command to establish the communication, such as, "Alexa, call Bob using the second communication system." As disclosed herein, the wakeword-detection component 220 may determine utterance of the wakeword and transmit audio data corresponding to the command to the speechlet component 290a of the speech system 120. The speech system 120, as disclosed herein, may determine that the audio data corresponds to the command and that the communication includes the second communication system 127. Inclusion of the second communication system may be determined by determining that the audio data includes a representation of a name of the second communication system 127 or by determining that the second device 112 is connected to the second communication system 127 but not the first communication system 125.

The speechlet component 290a may communicate with the communication gateway 244 to send and/or receive a request to send the communication data such as, for example, information related to a SIP invite 402a; the communication gateway 244 may communicate with the second communication system 127 to send corresponding communication data, such as the same or modified SIP invite 402b.

The speechlet component 290a may communicate with the communication-management system 242 to send, upon determining that the communication includes the second communication system 127, a token update request 404. The token update request 404 may include a command to update the token if the token is expired. The communication management system 242 may determine that the token is expired if, for example, a time between a time of receiving the token and a present time is greater than a threshold. If the communication management system 242 determines that the token is expired, it may send a request 406 for a new token to the second communication system 127 and may receive an updated token in response.

As mentioned above, communication between the communication management system 242 and the second communication system 127 may involve the account-linking system 246. The first SIP invite 402a may include username, password, or other information that identifies the user 5 to the first communication system 125; the second SIP invite 402b may include username, password, or other information that identifies the user 5 to the second communication system 127. The profile storage 248 may include communication account data 410, which may include the identification information (i.e., security token), and a token cache 412, which may store data indicating whether a token update is in progress, as described in greater detail below.

The communication gateway 244 may, in response to receiving the SIP invite 402a, send a request 408 to the communication management system 242. If the communication management system 242 determines that the token is not expired, it may send the token back to the communication gateway 244. If the token is expired, the communication management system 242 may send a request 406 for a new token to the second communication system 127. Before sending the request, the communication management system 242 may determine whether a token update is already in progress, as described above, by checking a token update status in the token cache 412. If a token update is already in progress, the communication management system 242 may delay sending a second request. In some embodiments, if a token update is pending but a certain amount of time has elapsed, such as two seconds, the communication management system 242 re-sends the token request.

As mentioned above, an account of the first communication system 125 may be associated with an account of the second communication system 127 according to embodiments of the present disclosure. The speech system 120 may receive a request from the first device 110 to integrate the account. The first user 5 may initiate the request by, for example, activating an application on the first device 110. The speech system 120, in response, may send a request to the first device 110 to cause the first device to output a prompt for information regarding the account, such as a username and/or password of the first user. The first device 110 may thereafter send the username and/or password to the speech system 120, which may forward the username and/or password to the second communication system 127. The second communication system 127 may send, to the first device 110, a request for authorization to integrate the account with the system. The user may thereafter cause the first device 110 to send an authorization confirmation. Upon receipt of the confirmation, the second communication system 127 may send a contact list of the first user and/or a security token. The security token may expire after a certain amount of time has passed; upon expiration, the speech system 120 may re-send the username and/or password and receive an updated security token. The second communication system 127 may further send additional information to the speech system 120, such as a list of features it may provide (e.g., calling or messaging); the speech system 120 may prompt the second communication system 127 for this information. The communication between the speech system 120 and the second communication system 127 may use an application programming interface (API) known to the speech system 120 and/or second communication system 127.

The contact list may change if and when the first user adds, deletes, and/or changes a contact stored therein. The second communication system 127 may send an updated contact list when such a change is made. The speech system 120 may instead or in addition periodically query the second communication system 127 for any updates to the contact list.

In some embodiments, the speech system 120 provides a contact provider service (CPS) to perform the linking of the account associated with the second communication system 127. The CPS may utilize further services, such as OAuth2.0, partner authorization material service (PAMS), or other such services. The security token may be an OAuth2.0 token or other token provided by the second communication system 127. The CPS may further communicate with an application executing on the first device 110 and/or a web browser executing on another device.

Referring to FIG. 5, the first device 110 may send a communication request 502 to the speech system 120 corresponding to communication with a second device 112. The communication request may include an intended recipient of the communication, such as a person, device, or place, as well as an indication of the second communication system 127, such as its name. The speech system 120 determines (504) that the request 502 corresponds to the second communication system 127 by analyzing the request 502 for the indication, such as by recognizing audio in the request that matches audio representing the name or by determining that the second device 112 is connected to the second communication system 127.

Upon determining that the request 502 corresponds to the second communication system 127, the system sends a token update request 506 to the first communication system 125. The token refresh request 506 may include the indication of the second communication system 127 and/or a user or account name corresponding to the user 5. The first communication system 125 may first check (508) a status of a stored token, if any, in the profile storage 248. If the token is expired, as explained above, the first communication system 125 sends a request for a new token 510 (via, in some embodiments, the account linking system 246) to the second communication system 127, which returns a new token 512. The first communication system 125 may store (514) the new token in the profile storage 248. At some point after and, in some embodiments, in parallel with sending the token refresh request 506, the first communication system 125 determines (516) an identity of the recipient of the communication request 502, as described herein. The first communication system 125 then sends, to the communication gateway 244, communication data; the communication data 518 may include a SIP invite, the token, and/or information identifying the user 5 or intended recipient. The communication gateway 244 may send, based at least in part on receiving the request 518, corresponding communication data 520 to the second communication system 127 to initiate the communication.

FIGS. 6A and 6B illustrate another embodiment of communication between components associated with the present disclosure. Referring first to FIG. 6A, as explained above, the first device 110 sends the communication request 502, the speech system 120 determines (504) that the request corresponds to the second communication system 127, the system sends a token refresh request 506 to the first communication system 125, and the first communication system checks (508) the status of a stored token and sends a request 510 for a new token to the second communication system 127.

The first communication system 127 may also, however, determine that a token refresh is in progress 602 by, for example, creating an entry in the token cache 408 corresponding to the token refresh. The entry may identify the first device 110, user 5, and/or second communication system. The entry may further identify the time of receiving the token refresh request 506 and/or or sending the request for new token 510. In some embodiments, the first communication system 125 removes the entry if a certain amount of time—i.e., a time-to-live (TTL); for example, two seconds—has elapsed since the time stored in the entry. The first communication system 125 may further remove the entry if and when the new token is received.

Referring also to FIG. 6B, the communication gateway 244 receives a SIP invite 604 from the speech system 120 and/or device 110 via, in various embodiments, the first communication system 125, an edge server, and/or an authentication server. In some embodiments, the communication gateway 244 sends a request 605 for a new token upon receiving the SIP invite 604 the first communication system 125 may determine that the token refresh is already in progress and therefore does not send the second token refresh request. If, however, the first communication system 125 determines that the TTL of the first request has elapsed, it may send the second request to the second communication system 127. As explained above, the first communication system 125 receives the new token 512, stores (514) it, determines (516) the recipient of the communication, and initiates (518) the communication.

Figure 7:
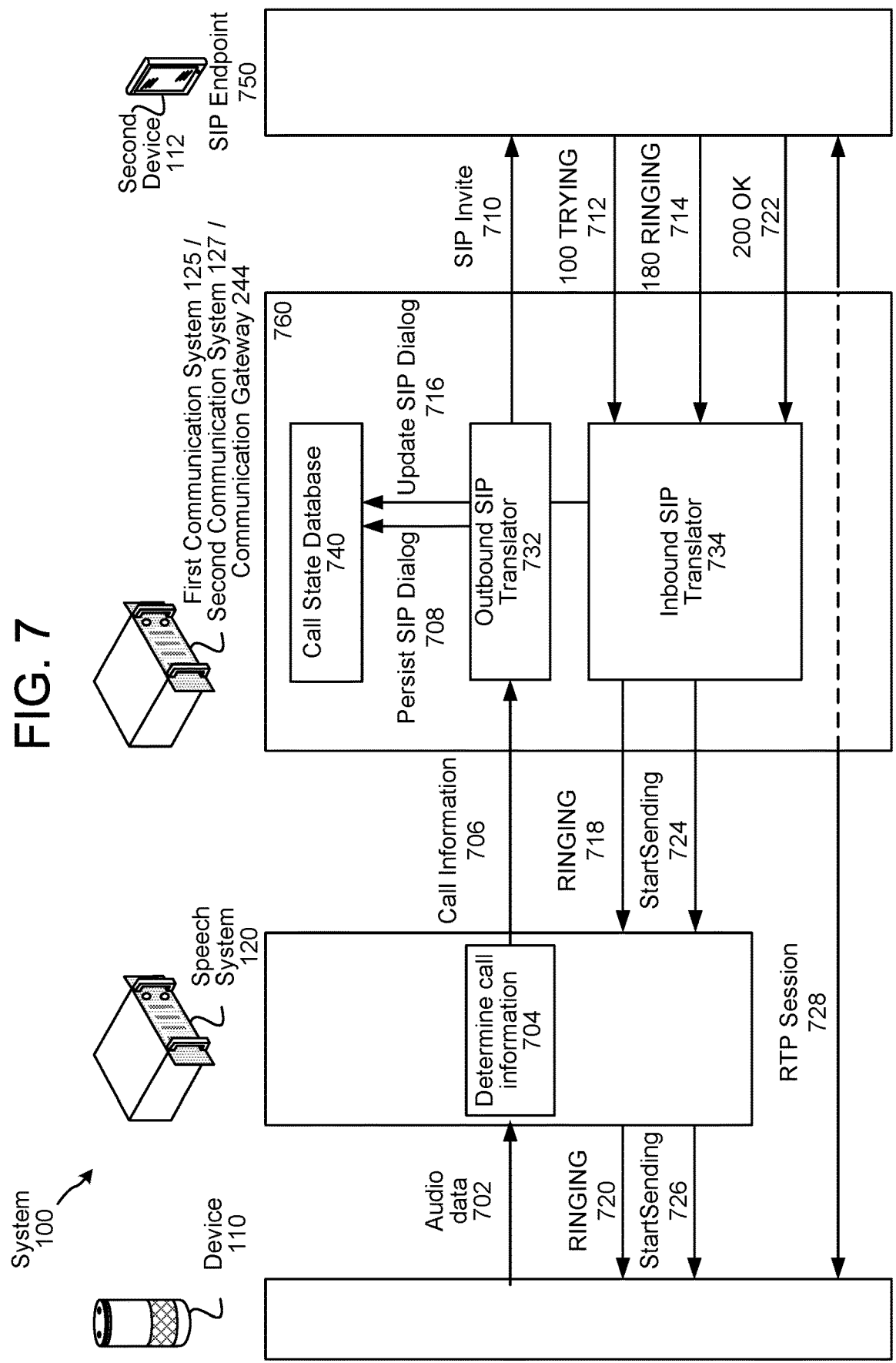
FIG. 7 illustrates an example of signaling to initiate a communication session according to embodiments of the present disclosure.

FIGS. 7, 8A, 8B, 9A, and 9B illustrate components that can be used to coordinate communication using a system such as that described herein. FIG. 7 illustrates an example of signaling to initiate a communication session according to the present disclosure. In one example, the speech system 120 is configured to enable voice commands (e.g., perform ASR, NLU, etc. to identify a spoken command included in audio data), and a communications network component(s) 760, which may include the communications network component 760 and/or the communication gateway 244, is configured to enable communication sessions (e.g., using session initiation protocol (SIP)). For example, the communications network component 760 may send SIP messages to endpoints (e.g., recipient devices) in order to establish a communication session for sending and receiving audio data and/or video data. The communication session may use network protocols such as real-time transport protocol (RTP), RTP Control Protocol (RTCP), Web Real-Time communication (WebRTC), and/or the like. For example, the communications network component 760 may send SIP messages to initiate a single RTP media stream between two endpoints (e.g., direct RTP media stream between the originating device 110 and a recipient device) and/or to initiate and facilitate RTP media connections between the two endpoints (e.g., RTP media streams between the originating device 110 and the communications network component 760 and between the communications network component 760 and a recipient device). During a communication session, the communications network component 760 may initiate two media streams, with a first media stream corresponding to audio data sent from the originating device 110 and to the recipient device and a second media stream corresponding to audio data sent from the recipient device and to the originating device 110, although for ease of explanation this may be illustrated as a single RTP media stream.

As illustrated in FIG. 7, the originating device 110 may send (702) audio data to the speech system 120 and the speech system 120 may determine (704) call information using the audio data and may send (706) the call information to the communications network component 760 (e.g., via the communication speechlet 290*a*). The speech system 120 may determine the call information by performing ASR, NLU, etc., as discussed herein, and the call information may include a data source name (DSN), a number from which to call, a number to which to call, encodings, and/or additional information. For example, the speech system 120 may identify from which phone number the originating user would like to initiate the call, to which phone number the originating user would like to initiate the call, from which device 110 the originating user would like to perform the call, etc.

While FIG. 7 illustrates the speech system 120 sending the call information to the communications network component 760 in a single step (e.g., 706), the present disclosure is not limited thereto. Instead, the speech system 120 may send the call information to the originating device 110 and the originating device 110 may send the call information to the communications network component 760 in order to initiate the call without departing from the present disclosure. Thus, the speech system 120 may not communicate directly with the communications network component 760 in step 706, and may instead instruct the originating device 110 to communicate with the communications network component 760 in order to initiate the call.

The communications network component 760 may include an outbound SIP translator 732, an inbound SIP translator 734, and a call state database 740. The outbound SIP translator 732 may include logic to convert commands received from the speech system 120 into SIP requests/responses and may handle sending outgoing SIP requests and sending responses to incoming SIP requests. After receiving the call information, the outbound SIP translator 732 may persist (708) a SIP dialog using the call state database 740. For example, the DSN may include information such as the name, location, and driver associated with the call state database 740 (and, in some examples, a user identifier and password of the originating user) and the outbound SIP translator 732 may send a SIP dialog to the call state database 740 regarding the communication session. The call state database 740 may persist the call state if provided a device identifier and one of a call identifier or a dialog identifier. The outbound SIP translator 732 may send (710) a SIP Invite to a SIP Endpoint 750 (e.g., a recipient device, a Session Border Controller (SBC), or the like). While one SIP Endpoint 750 is illustrated, one skilled in the art will appreciate that SIP invites may be sent to more than one SIP Endpoint 750.

The outbound SIP translator 732 may send the SIP Invite to a separate communication system, such as a cellular service provider. The cellular service provider may send the SIP invite to the SIP Endpoint 750. It will thus be appreciated that a cellular service provider (or other communication modality provider) may act as an intermediary between the communications network component 760 and an SIP Endpoint 750. Various APIs or other components may be used to exchange messages across different communication systems.

The inbound SIP translator 734 may include logic to convert SIP requests/responses into commands to send to the speech system 120 and may handle receiving incoming SIP requests and incoming SIP responses. The SIP endpoint 750 may send (712) a 100 TRYING message to the inbound SIP translator 734 and may send (714) a 180 RINGING message to the inbound SIP translator 734. The inbound SIP translator 734 may update (716) the SIP dialog using the call state database 740 and may send (718) a RINGING message to the speech system 120, which may send (720) the RINGING message to the originating device 110. Alternatively, the inbound SIP translator 734 may send the RINGING message to the originating device 110 without using the speech system 120 as an intermediary.

When the communication session is accepted by the SIP endpoint 750, the SIP endpoint 750 may send (722) a 200 OK message to the inbound SIP translator 734, the inbound SIP translator 745 may send (724) a startSending message to the speech system 120, and the speech system 120 may send (726) the startSending message to the originating device 110. Alternatively, the inbound SIP translator 734 may send the startSending message to the originating device 110 without using the speech system 120 as an intermediary. The startSending message may include information associated with an internet protocol (IP) address, a port, encoding, or the like required to initiate the communication session. Using the startSending message, the originating device 110 may establish (728) an RTP communication session with the SIP endpoint 750 via the communications network component 760. The RTP session may be referred to as direct audio communication functionality as speech captured by one device of the RTP session may be sent as audio data to another device of the RTP session, which outputs the speech to a recipient user.

For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, video data, and/or any other multimedia data without departing from the disclosure.

Figure 8A:
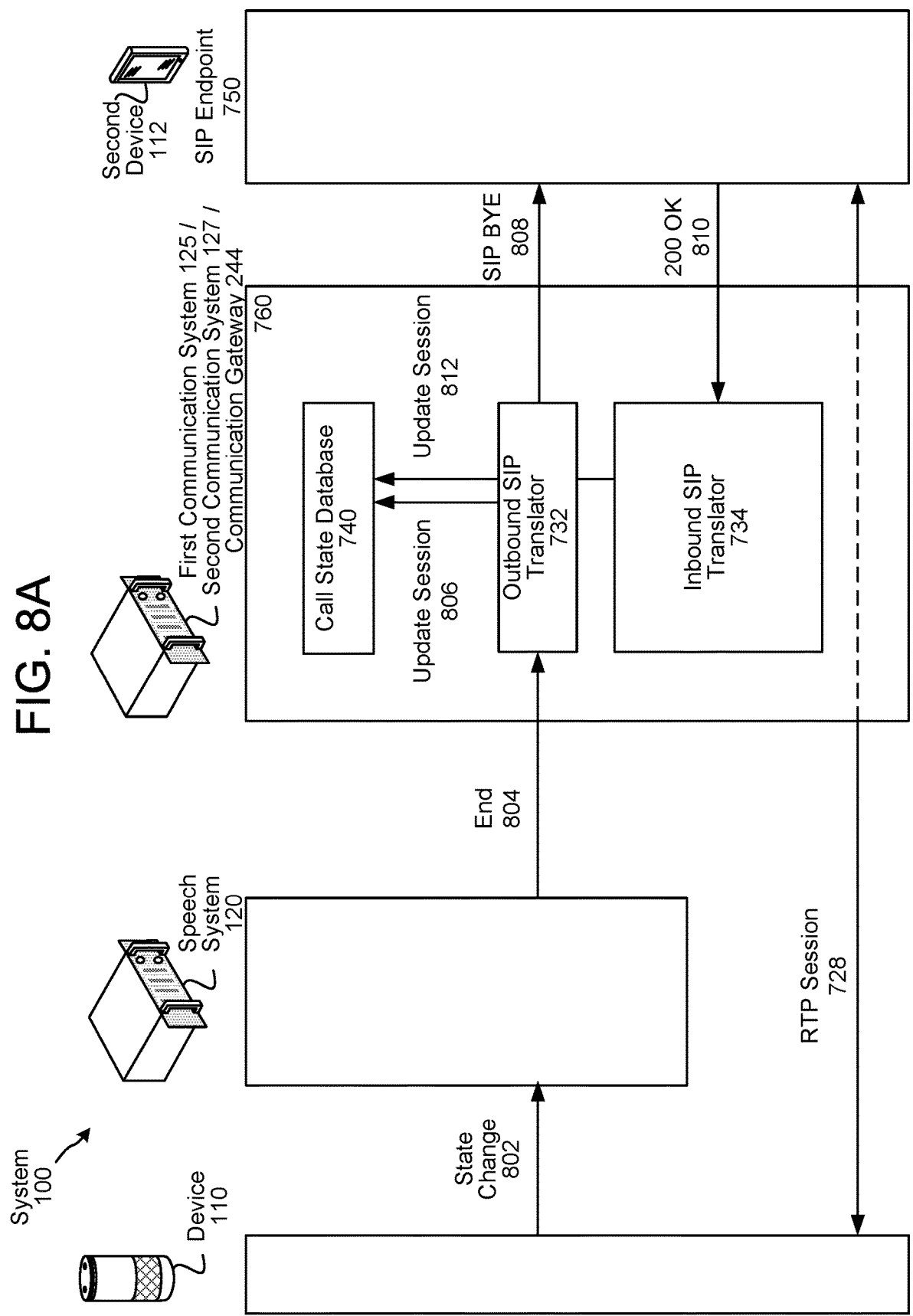

FIGS. 8A and 8B illustrate examples of signaling to end a communication session according to the present disclosure. After establishing the RTP communication session 728 between the originating device 110 and the SIP endpoint 1250, the RTP communication session may be ended by the originating user inputting a command, to end the call, to the originating device 110, as illustrated in FIG. 8A, or a recipient user inputting a command, to end the call, to the SIP endpoint 750, as illustrated in FIG. 8B.

As illustrated in FIG. 8A, the originating device 110 may send (802) a state change message to the speech system 120 and the speech system 120 may send (804) an end message to the communications network component 760. The outbound SIP translator 732 may update (806) the session using the call state database 740 and may send (808) a SIP BYE message to the SIP endpoint 750. The SIP endpoint 750 may send (810) a 200 OK message to the inbound SIP translator 734 and the inbound SIP translator 734 may update (812) the session using the call state database 740. In some examples, the inbound SIP translator 734 may send the 200 OK message to the originating device 110 to confirm the communication session has been ended. Thus, the RTP communication session 728 may be ended between the originating device 110 and the SIP endpoint 750.

As illustrated in FIG. 8B, the SIP endpoint 750 may send (852) a SIP BYE message to the inbound SIP translator 734 and the inbound SIP translator 734 may update (854) the session using the call state database 740. The inbound SIP translator 734 may send (856) a stopSending message to the speech system 120 and the speech system 120 may send (858) the stopSending message to the originating device 110. The originating device 110 may send (860) a state change message to the system 120 and the speech system 120 may send (862) an End message to the outbound SIP translator 732, the End message including a DSN. The outbound SIP translator 732 may then update (864) the session using the call state database 740, and send (866) a 200 OK message to the SIP endpoint 750. Thus, the RTP communication session 728 may be ended between the originating device 110 and the SIP endpoint 750.

While FIGS. 8A and 8B illustrate the speech system 120 acting as an intermediary between the originating device 110 and the communications network component 760, the present disclosure is not limited thereto. Instead, steps 802 and 804 may be combined into a single step and the originating device 110 may send the state change message and/or the End message to the communications network component 760 without using the speech system 120 as an intermediary. Similarly, steps 766 and 758 may be combined into a single step and the communications network component 760 may send the StopSending message to the originating device 110 without using the system 120 as an intermediary, and/or steps 860 and 862 may be combined into a single step and the originating device 110 may send the state change message and/or the End message to the communications network component 760 without using the speech system 120 as an intermediary.

While FIGS. 7, 8A, and 8B illustrate the RTP communication session 728 being established between the originating device 110 and the SIP endpoint 750, the present disclosure is not limited thereto and the RTP communication session 728 may be established between the originating device 110 and a telephone network associated with the SIP endpoint 750 without departing from the present disclosure.

Figure 9A:
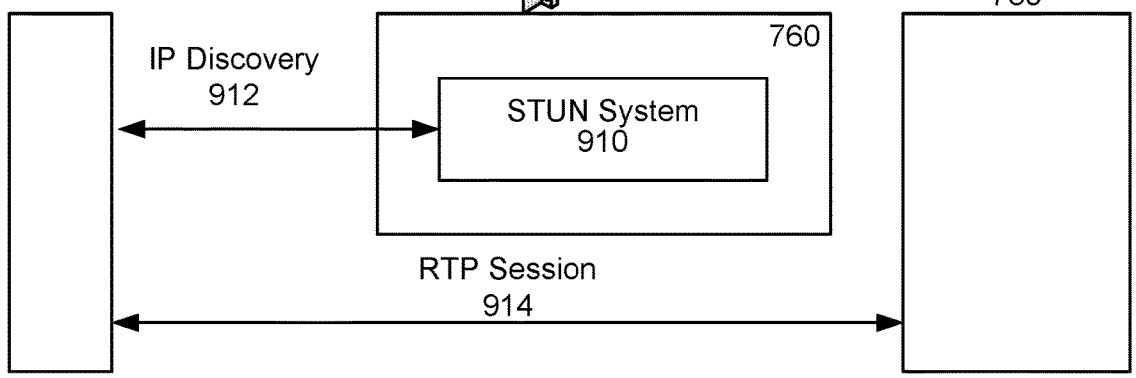
FIGS. 9A and 9B illustrate examples of establishing communication connections to send media between devices according to embodiments of the present disclosure.
Figure 9B:
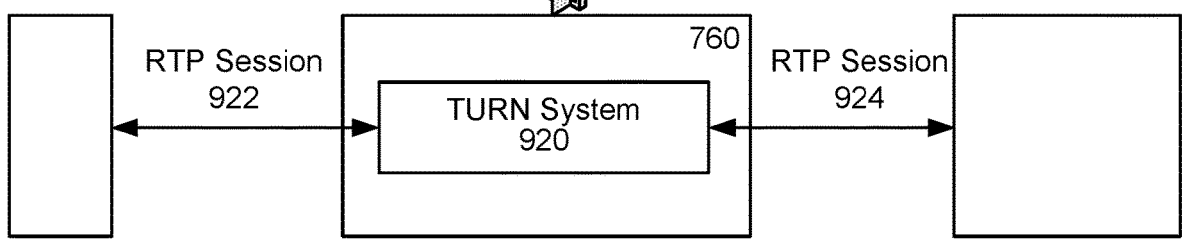

FIGS. 9A and 9B illustrate examples of establishing media connections between devices according to the present disclosure. In some examples, the originating device 110 may have a publicly accessible IP address and may be configured to establish the RTP communication session directly with the SIP endpoint 750. To enable the originating device 110 to establish the RTP communication session, the communications network component 760 may include Session Traversal of User Datagram Protocol (UDP) Through Network Address Translators (NATs) system (e.g., STUN system 910). The STUN system 910 may be configured to allow NAT clients (e.g., an originating device 110 behind a firewall) to setup calls to a VoIP provider hosted outside of the local network by providing a public IP address, the type of NAT they are behind, and a port identifier associated by the NAT with a particular local port. As illustrated in FIG. 9A, the originating device 110 may perform (912) IP discovery using the STUN system 910 and may use this information to set up an RTP communication session 914 (e.g., UDP communication) between the originating device 110 and the SIP endpoint 750 to establish a call.

In some examples, the originating device 110 may not have a publicly accessible IP address. For example, in some types of NAT the originating device 110 cannot route outside of the local network. To enable the originating device 110 to establish an RTP communication session, the communications network component 760 may include Traversal Using relays around NAT (TURN) system 920. The TURN system 920 may be configured to connect the originating device 110 to the SIP endpoint 750 when the originating device 110 is behind a NAT. As illustrated in FIG. 9B, the originating device 110 may establish (922) an RTP session with the TURN system 1420 and the TURN system 1420 may establish (1424) an RTP session with the SIP endpoint 1250. Thus, the originating device 110 may communicate with the SIP endpoint 750 via the TURN system 920. For example, the originating device 110 may send audio data to the communications network component 760 and the communications network component 760 may send the audio data to the SIP endpoint 750. Similarly, the SIP endpoint 750 may send audio data to the communications network component 760 and the communications network component 760 may send the audio data to the originating device 110.

In some examples, the system may establish communication sessions using a combination of the STUN system 910 and the TURN system 920. For example, a communication session may be more easily established/configured using the TURN system 920, but may benefit from latency improvements using the STUN system 910. Thus, the system may use the STUN system 910 when the communication session may be routed directly between two devices and may use the TURN system 920 for all other communication sessions. Additionally or alternatively, the system may use the STUN system 910 and/or the TURN system 920 selectively based on the communication session being established. For example, the system may use the STUN system 910 when establishing a communication session between two devices (e.g., point-to-point) within a single network (e.g., corporate LAN and/or WLAN), but may use the TURN system 920 when establishing a communication session between two devices on separate networks and/or three or more devices regardless of network(s). When the communication session goes from only two devices to three or more devices, the system may need to transition from the STUN system 910 to the TURN system 920. Thus, if the system anticipates three or more devices being included in the communication session, the communication session may be performed using the TURN system 920. When the communication session goes from three or more devices to only two devices, the system may need to transition from the TURN system 920 to the STUN system 910.

Figure 10:
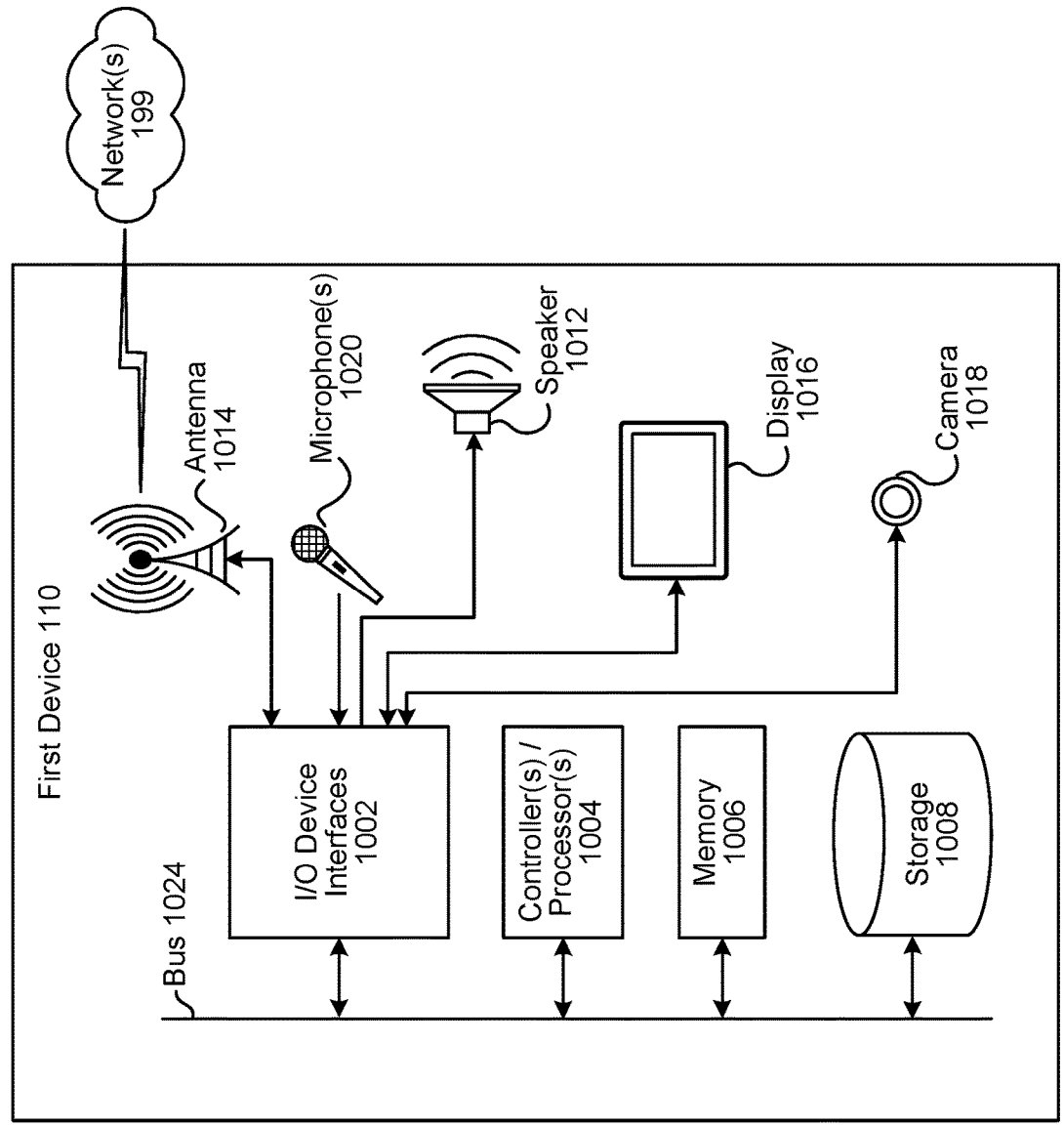
FIG. 10 is a block diagram conceptually illustrating example components of a device according to embodiments of the present disclosure.
Figure 11A:
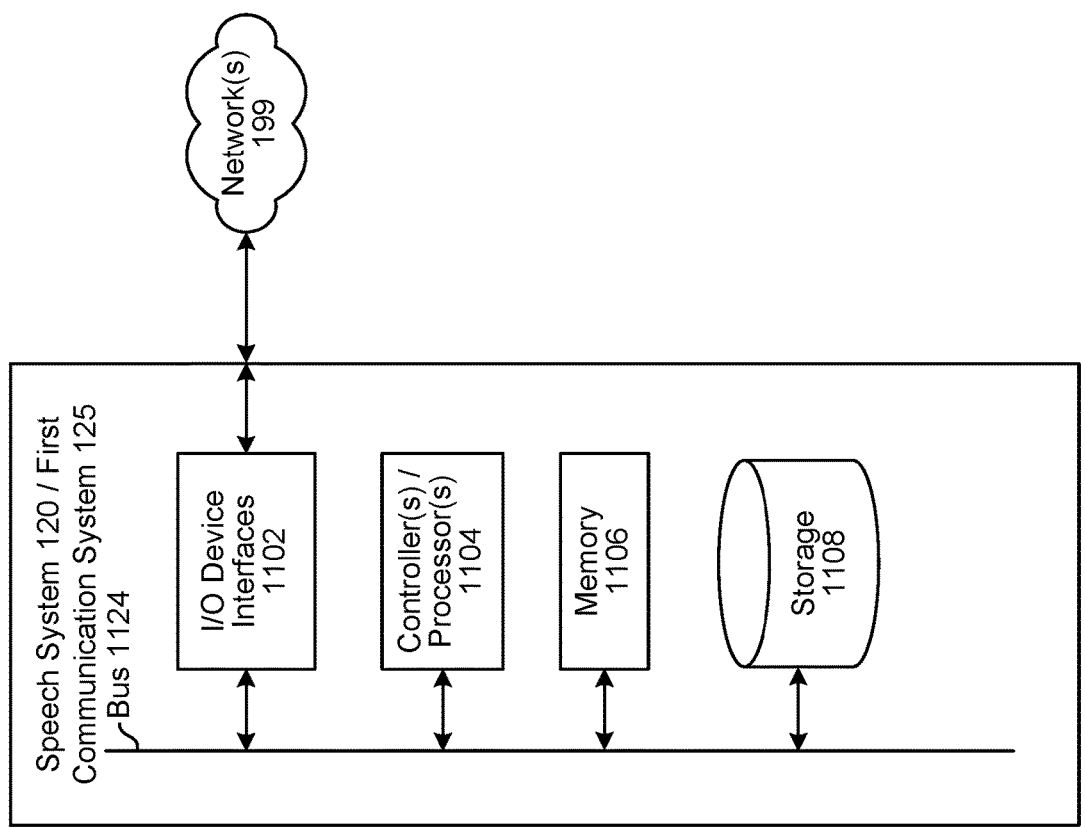
FIG. 11A is a block diagram conceptually illustrating example components of a system according to embodiments of the present disclosure.
Figure 11B:
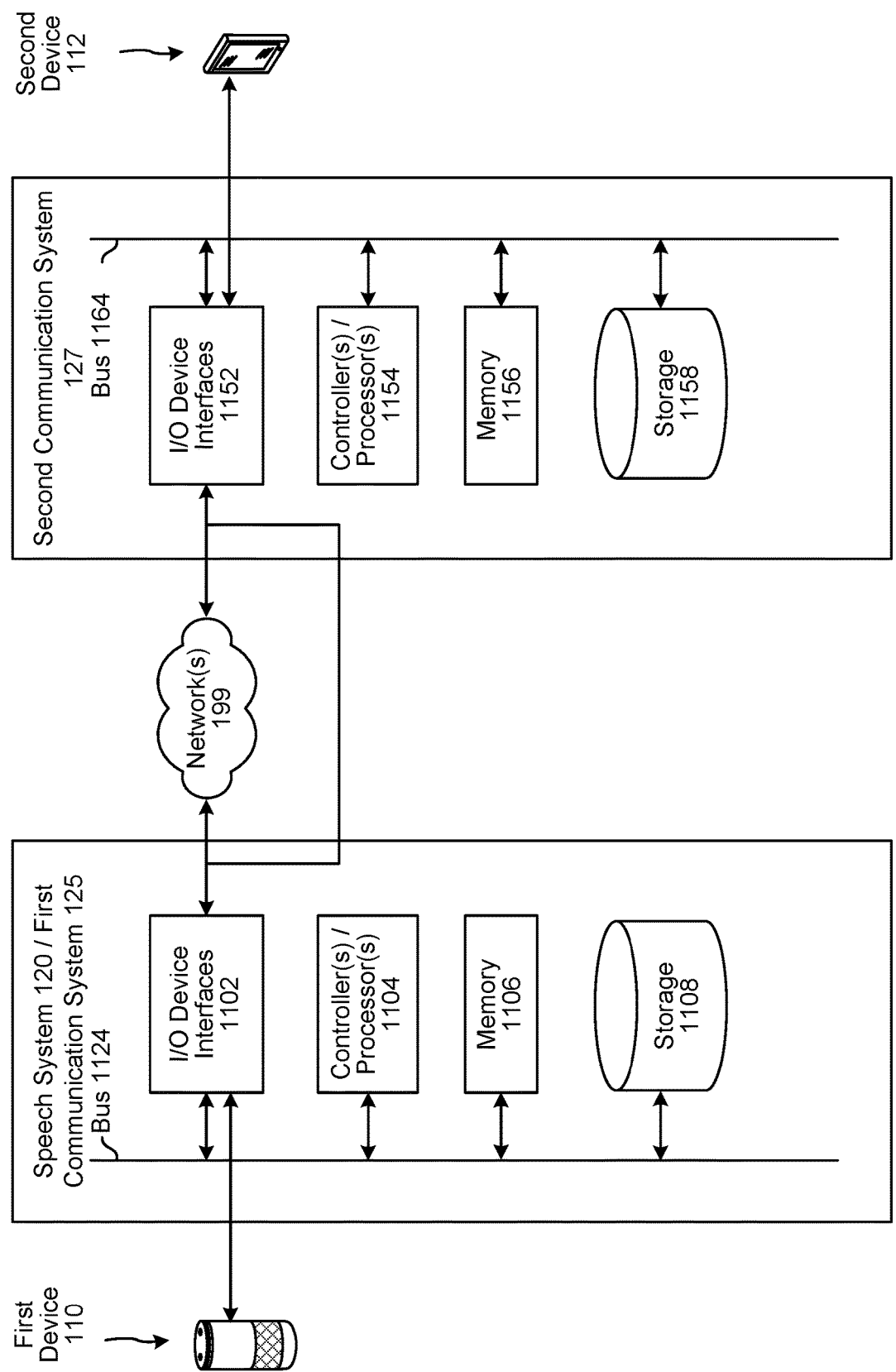
FIG. 11B is a block diagram conceptually illustrating example components of a system in communication with a second communications system according to embodiments of the present disclosure.

FIG. 10 is a block diagram conceptually illustrating a device 110 that may be used with the system 100. FIG. 11A is a block diagram conceptually illustrating example components of the speech system 120 and/or first communication system 125, which may be one or more servers and which may assist with ASR processing, NLU processing, etc. FIG. 11B is a block diagram conceptually illustrating example components of the speech system 120 and/or first communication system 125 and the second communication system 127. The term "system" as used herein may refer to one or more traditional system(s) as understood in a system/client computing structure but may also refer to a number of different computing components that may assist with the operations discussed herein. For example, a the system 100 may include one or more physical computing components (such as a rack system) that are connected to other devices/components either physically and/or over a network and is capable of performing computing operations. The system 100 may also include one or more virtual machines that emulates a computer system and is run on one or across multiple devices. The system 100 may also include other combinations of hardware, software, firmware, or the like to perform operations discussed herein. The system 100 may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the speech system 120 and/or first communication system 125, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/120/125/127) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125/127) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125/127) may also be connected to removable or external non-volatile memory and/or storage (such as a removable memory card, memory key drive, networked storage, etc.) through respective input/output device interfaces (1002/1102).

Computer instructions for operating each device/system (110/120/125/127) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device/system (110/120/125/127) includes input/output device interfaces (1002/1102). A variety of components may be connected through the input/output device interfaces (1002/1102), as will be discussed further below. Additionally, each device (110/120/125/127) may include an address/data bus (1024/1124) for conveying data among components of the respective device. Each component within a device (110/120/125/127) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical systems in a collection of systems or other components.

The components of the device(s) 110, the system 120, the first communication system 125, and/or the second communication system 127 may include their own dedicated processors, memory, and/or storage. Alternatively, one or more of the components of the device(s) 110, the system 120, or the first and/or second communication systems 125, 127 may utilize the I/O interfaces (1002/1102), processor(s) (1004/1104), memory (1006/1106), and/or storage (1008/1108) of the device(s) 110 system 120, or the communication system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and the first and/or second communication systems 125, 127, as described herein, are illustrative, and may be located as a stand-alone device or may be included, in whole or in part, as a component of a larger device or system.

Referring to FIG. 11B, the speech system 120 and/or first communication system 125 may, as described herein, be separate and distinct systems from the second communication system 127. That is, as described below, the speech system 120 and/or first communication system 125 may include a first processor, memory, and/or storage that is separate and distinct from a second processor, memory, and/or storage of the second communication system 127. The speech system 120 and/or first communication system 125 may communicate via the network 199 with the second communications system 127. In some embodiments, the speech system 120 and/or first communication system 125 communicates with the second communications system 127 without using the network 199, such as by using, for example, a device interface. The speech system 120 and/or first communication system 125 may further communicate with the first device 110, and the second communication system 127 may communicate with the second device 112. The second communication system 127 may include, as described above with reference to FIG. 11A, an I/O device interface 1152, a processor 1154, memory 1156, and storage 1158, which may communicate using a bus 1164.

The processor 1154 may execute instructions in the memory 1156 to generate a security token; the second communication system 127 may receive, from the speech system 120 and/or first communication system 125, a request for the token. Upon receipt of this request, the second communication system 127 may send, using the network 199 and/or using a direct connection, the security token to the speech system 120 and/or first communication system 125. The second communication system 127 may further receive, from the speech system 120 and/or first communication system 125, a request to establish communications with the second device 112; this request may be accompanied by the security token. The processor 1154 may execute instructions in the memory 1156 to determine that the token is valid and, if so, allow communications with the second device 112 to be established.

The second communication system 127 may store the security token in the storage 1158. The second communication system 127 may limit read and/or write access to the security token by other systems, such as the speech system 120 and/or first communication system 125. For example, the second communication system 127 may send the security token to the speech system 120 and/or first communication system 125 only if the speech system 120 and/or first communication system 125 provides authentication information corresponding to a user of the first device 110. As mentioned above, the storage 1158 may similarly contain user profile information, such as a contact list associated with a second user of the second device; the second communication system 127 may similarly limit access to this user profile information.

The speech system 120 and/or first communication system 125 may control access to other data stored in the storage 1108; the second communication system 127 may similarly control access to other data stored in the storage 1158. This control may include receiving a request to read and/or write data in the storage 1108/1158 from another system, processing the request, and granting read and/or write access based on the request. For example, the second communication system 127 may receive, from the speech system 120 and/or first communication system 125, a request for user-account information, such as a contact list. The second communication system 127 may control access to this data by verifying that a username and password associated with the contact list are valid. The second communication system 127 may grant access to this information only after determining that validity.

The speech system 120 and/or first communication system 125 and the second communication system 127 may communicate, using the network 199 and/or directly, using one or more application programming interfaces (APIs). For example, the second communication system 127 may send, to the speech system 120 and/or first communication system 125, definitions of a number of commands associated with an API, and the speech system 120 and/or first communication system 125 may thereafter request access to data in the storage 1158 using the commands. The second communication system 127 may similarly request access to data in the storage 1108 using the same or a different API.

Figure 12:
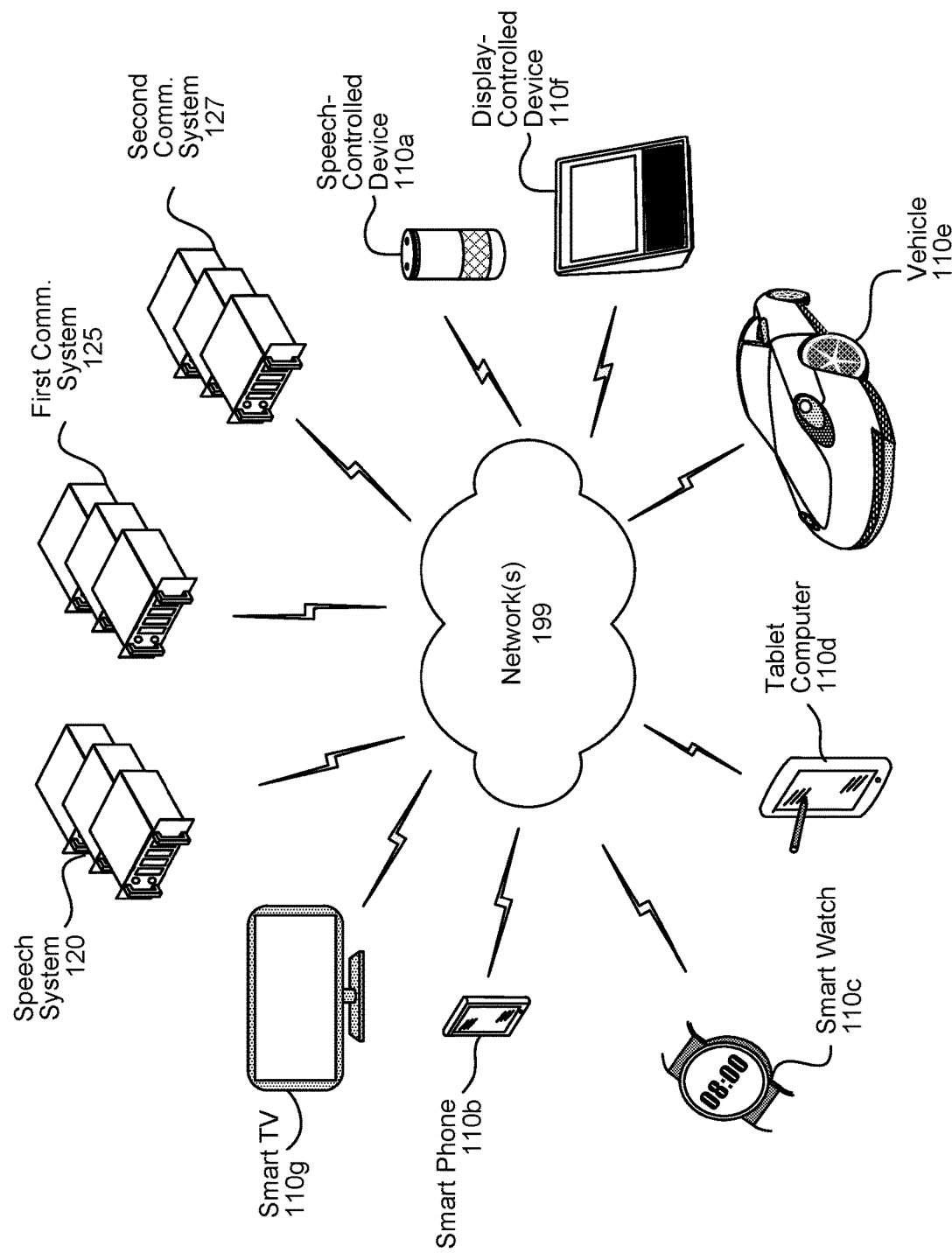
FIG. 12 illustrates an example of a network of devices according to embodiments of the present disclosure.

As illustrated in FIG. 12, multiple devices (110a-110g, 120, 125, 127) may contain components of the system, and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, and/or a smart television 110g may be connected to the network(s) 199 through a wireless service provider, over a WiFi or cellular network connection, or the like. Other devices are included as network-connected support devices, such as the system 120, the first communication system 125, the second communication system 127 and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
  receiving, at a first communication system and from a second communication system, a first token associated with a first user profile associated with the second communication system and a second device, the first token being valid for a first period of time during which a plurality of two-way voice communications can be performed using the first communication system and the second communication system;

receiving, at the first communication system and from a first device, a first request to establish a first two-way voice communication with the second device;

determining that the second device is associated with the second communication system;

determining that the first token has expired;

sending, to the second communication system, a second request for an updated token;

after sending the second request, receiving a second token from the second communication system;

sending, to the second communication system, the first request and the second token;

establishing the first two-way voice communication between the first device and the second device;

receiving, at the first communication system from the first device, a third request to establish a second two-way voice communication with the second device;

determining the second token is unexpired; and sending, to the second communication system, the third request and the second token.

2. The computer-implemented method of claim 1, further comprising:

determining that a response to the second request has not been received by the first communication system; and based at least in part on determining that the response has not been received, delaying sending, to the second communication system, a fourth request for the updated token.

3. The computer-implemented method of claim 2, further comprising:

prior to receiving the second token, storing an indication of a time of sending the second request;

based at least in part on the time of sending and a present time, sending the fourth request; and receiving, from the second communication system, a third token.

4. A computer-implemented method comprising:

receiving, at a first communication system and from a second communication system, a first token associated with a first user profile associated with the second communication system and a second device, the first token being valid for a period of time during which a plurality of communication data can be sent from the first communication system to the second communication system;

receiving, at the first communication system from a first device, a first request to send first communication data to the second device;

determining that the first request corresponds to the second communication system;

based at least in part on determining that the first request corresponds to the second communication system, sending, to the second communication system, a second request for an updated token associated with the first user profile;

after sending the second request, receiving a second token from the second communication system;

sending, to the second communication system and using the second token, a third request for the first communication data to be sent to the second device;

receiving, at the first communication system from the first device, a fourth request to send second communication data to the second device;

determining the second token is unexpired; and sending, to the second communication system, the second communication data and the second token.

5. The computer-implemented method of claim 4, further comprising, prior to receiving the second token:

receiving a fifth request for the first token;

determining that a response to the second request has not been received by the first communication system; and based at least in part on determining that the response has not been received, delaying sending, to the second communication system, a sixth request for the updated token.

6. The computer-implemented method of claim 5, further comprising:

determining that the second request has expired; and based at least in part on determining that the second request has expired, sending the sixth request to the second communication system.

7. The computer-implemented method of claim 6, further comprising:

storing an indication of a time of sending the second request, wherein determining that the second request has expired is based at least in part on the time of sending and a current time.

8. The computer-implemented method of claim 4, further comprising:

determining a time of receipt of the first token, wherein sending the second request is based at least in part on the time of receipt and a current time.

9. The computer-implemented method of claim 4, further comprising:

determining that the first request includes of a name of the second communication system.

10. The computer-implemented method of claim 4, further comprising:

determining a second user profile associated with the first device;

determining contact data associated with the second user profile; and determining that an intended recipient of the first communication data is absent from the contact data.

11. The computer-implemented method of claim 4, further comprising:

determining a second user profile associated with the first device;

determining, in the second user profile, first data associated with an intended recipient of the first communication data; and determining that the first data indicates that the intended recipient prefers the second communication system.

12. A first system comprising:

at least one processor; and at least one memory comprising instructions that, when executed by the at least one processor, cause the first system to:

receive, at a first communication system and from a second communication system, a first token associated with a first user profile associated with the second communication system and a second device, the first token being valid for a period of time during which a plurality of communication data can be sent from the first communication system to the second communication system;

receive, at the first communication system from a first device, a first request to send first communication data to the second device;

determine that the first request corresponds to the second communication system;

based at least in part on determining that the first request corresponds to the second communication system, send, to the second communication system, a second request for an updated token associated with the first user profile;

after sending the second request, receive a second token from the second communication system;

send, to the second communication system and using the second token, a third request for the first communication data to be sent to the second device;

receive, at the first communication system from the first device, a fourth request to send second communication data to the second device;

determine the second token is unexpired; and send, to the second communication system, the second communication data and the second token.

13. The first system of claim 12, wherein the at least one memory further comprises instructions that, when executed by the at least one processor, further cause the first system to:

receive a fifth request for the first token;

determine that a response to the second request has not been received by the first communication system; and based at least in part on determining the response has not been received, delay sending, to the second communication system, a sixth request for the updated token.

14. The first system of claim 13, wherein the at least one memory further comprises instructions that, when executed by the at least one processor, further cause the first system to:

determine that the second request has expired; and based at least in part on determining that the second request has expired, send the sixth request to the second communication system.

15. The first system of claim 14, wherein the at least one memory further comprises instructions that, when executed by the at least one processor, further cause the first system to:

store an indication of a time of sending the second request; and determine the second request has expired based at least in part on the time of sending and a current time.

16. The first system of claim 12, wherein the at least one memory further comprises instructions that, when executed by the at least one processor, further cause the first system to:

determine a time of receipt of the first token; and send the second request based at least in part on the time of receipt and a current time.

17. The first system of claim 12, wherein the at least one memory further comprises instructions that, when executed by the at least one processor, further cause the first system to:

determine that the first request includes a name of the second communication system.

18. The first system of claim 12, wherein the at least one memory further comprises instructions that, when executed by the at least one processor, further cause the first system to:

determine a second user profile associated with the first device;

determine contact data associated with the second user profile; and determine that an intended recipient of the first communication data is absent from the contact data.

* * * * *